United States Patent [19]
Dauer et al.

[11] 3,781,508
[45] Dec. 25, 1973

[54] APPARATUS FOR PLASMA WELDING

[75] Inventors: Horst Dauer, Pfaffenhofen; Peter Hildebrandt, Ismaning, both of Germany

[73] Assignee: Messer Griesheim GmbH, Frankfurt/Main, Germany

[22] Filed: Sept. 13, 1971

[21] Appl. No.: 179,896

[30] Foreign Application Priority Data
Sept. 18, 1970 Germany.................. P 20 46 227.5

[52] U.S. Cl. .......... 219/121 P, 219/131 R, 323/123
[51] Int. Cl.............................................. B23k 9/00
[58] Field of Search................ 219/131 R, 131 WR, 219/130, 121 P, 108; 323/123

[56] References Cited
UNITED STATES PATENTS
| | | | |
|---|---|---|---|
| 3,141,950 | 7/1964 | Chiasson.......................... | 219/108 X |
| 3,549,973 | 12/1970 | Stearns et al. .............. | 219/131 R X |
| 3,330,933 | 7/1967 | Gaklary............................ | 219/131 R |
| 3,652,824 | 3/1972 | Okada............................. | 219/131 WR |
| 3,598,954 | 8/1971 | Iceland............................ | 219/131 R |
| 3,382,345 | 5/1968 | Normando.................... | 219/131 WR |

*Primary Examiner*—R. F. Staubly
*Assistant Examiner*—Gale R. Peterson
*Attorney*—Karl F. Ross

[57] ABSTRACT

Plasma welding of light-metal workpieces and materials subject to oxidation is carried out using square-wave alternating current. The energization circuit comprises a bridge of controllable rectifier-type elements, the welding electrode network being positioned in a diagonal of the bridge while a direct-current source with a declining characteristic is connected across the other diagonal.

8 Claims, 5 Drawing Figures

Horst Dauer
Peter Hildebrandt
INVENTORS.

Karl F. Ross
Attorney

Horst Dauer
Peter Hildebrandt
INVENTORS.

Karl F. Ross
Attorney

APPARATUS FOR PLASMA WELDING

FIELD OF THE INVENTION

Our present invention relates to an apparatus for the plasma welding of metals and, more particularly, to a system (i.e. a method of and a circuit for plasma welding) whereby a plasma is used to melt light metals, materials in thin sheets and other substrates in which oxidation of the molten metal and/or burnthrough of the substrate is a problem.

BACKGROUND OF THE INVENTION

As is generally recognized, a plasma is an ionized stream of gas in a more or less stable condition, generally at such high temperatures that an ionized state is maintained in spite of the recombination of charged species in the stream. Plasma-arc welding, plasma cutting and other processes are known in which the high temperature of the ionized stream, i.e. the plasma is employed to melt a metal. During such processes, the plasma may be generated continuously by feeding an ionizable gas through a plasma generator in which a nozzle receives with close spacing a plasma electrode and an electric discharge or arc is maintained between this electrode and a surrounding portion of the nozzle wall. The gas thus traverses an electric discharge and is ionized so that it can be projected at high temperatures against the workpiece. For the most part, plasma welding, i.e. the fusion of metals to metal using the high temperatures of an arc-generated plasma, is energized by direct current. The use of direct currents have, however, been found to be disadvantageous in that, especially for the welding of thin metal bodies, the plasma arc is relatively unstable. Especially with light metals, such as aluminum, the pool of metal created by the plasma torch develops an oxide layer which alters physical properties of the weld. Moreover, the development and destruction of the oxygen layer varies the contact resistance or passive resistance in the region in which it is formed and causes abrupt changes in the voltage across the plasma arc which generally is struck in part between the workpiece and the plasma electrode. These fluctuations in electrical parameters are accompanied by changes in the current amplitude so that the weld seam may become uncontrollable and of reduced quality. For example, excessively high current amplitudes may result in burnthrough of the substrate and the formation of holes therein while relatively low-current amplitudes may preclude effective bonding of the weld metal to a substrate metal and vice versa. Thus it is important to prevent the formation of substances during welding which may interfere with a constant current flow between the plasma torch and the substrate.

OBJECTS OF THE INVENTION

It is the principal object of the present invention to provide an improved apparatus for the plasma welding of a workpiece whereby the aforementioned disadvantages may be obviated.

It is another object of the invention to provide a system for plasma welding a metallic workpiece, especially thin substrates composed of light metals, which will prevent burn-through and nevertheless provide an effective bond between the substrate metal and a weld metal.

Yet another object of the invention is the provision of an improved apparatus for the plasma-arc welding of such materials and especially an improved circuit for controlling such welding which, at low cost, provides improved constant current performance with a plasma-welding device.

SUMMARY OF THE INVENTION

These objects and others which will become apparent hereinafter are attained, in accordance with the present invention, in a system for plasma welding a substrate in which the electrode of the plasma torch is energized with a substantially rectangular waveform pulses of alternating current, especially an electric current so applied that the workpiece is briefly brought to a negative potential and the plasma electrode to a positive potential to restrict the formation of an oxide layer.

In other words the invention resides in a method of and a circuit for the operation of a plasma torch or burner in which the workpiece and the electrode of the plasma torch are alternately poled negatively and positively, respectively, during one half cycle of operation and shortly thereafter are reversed in polarity, thereby preventing the formation of oxide films, even when the plasma torch is used for the cutting and welding of so-called light metals and relatively thin workpieces. The system of the present invention has also been found to stabilize the plasma arc, even when the arc is contracted. We have already indicated that the invention finds its principal utility in processes involving the welding of thin sheets of light metals, especially aluminum and titanium. It has also been found to be effective for the welding of thin sheets of zirconium which has, in the past, posed particular problems.

The square-wave pulses, according to the present invention, are provided preferably with a slight spacing or interval and we define the interval between the application of reverse pulses to the respective electrodes, i.e. the interval between switchover of the electrode or workpiece from a positive to a negative potential, or vice versa, as the switchover time, the potential being brought to a zero or null value during this period. Since the current flow at this interval is zero, there is a tendency for the plasma arc to extinguish or quench and we prefer to dimension this interval so that it is smaller than the deionization period of the plasma arc. In other words, this feature of the invention is based upon our finding that, upon termination of the welding current and welding voltage, the plasma arc extinguishes but only after a finite period, i.e. the quenching is not instantaneous. We thus prefer to dimension the polarity-reversal time switchover interval so that it is shorter than this deionization period or the quenching time of the plasma arc. In this manner polarity reversal can be effected without danger of extinguishing the plasma arc.

According to still another feature of the invention, the square wave cadence applied across the plasma generator and the workpiece is equal to the supply frequency of an alternating-current source, thereby eliminating the need for further circuitry to control the frequency of the periodically reversing pulses applied across the electrode and the workpiece. However, when supply-frequency control is not used, a suitable oscillator operating at any frequency but preferably of the order of magnitude of the supply frequency (50 to 60 Hz), may be used. The supply-frequency control method and circuit, according to the present invention, simplifies and reduces the cost of the operation.

According to the instant invention, moreover, the welding current can be considered a train of rectangular current pulses in which a positive pulse over one half cycle is followed by a negative pulse over the next half cycle. To increase the stability of the plasma arc, we have found it to be desirable to maintain a ratio between the lengths (durations) of two successive rectangular-pulse half cycles of the welding current in a ratio between 1:1 and 1:2.5 and to make these durations or lengths adjustable. Preferably, the amplitude of the positive and negative half-cycle square-wave pulses are independently adjustable.

While we have used the term "square wave" herein in its commonly employed sense to mean a pulse having substantially vertical leading and trailing flanks and a constant amplitude over the duration of the pulse, the signal may not accurately represent a square and in fact may be rectangular. Hence, we use the term square wave in the broader sense of meaning rectangular pulses and may employ the term "rectangular-pulse train" to identify a similar sequence of pulses.

Best results are obtained when the rectangular pulse train of pulses of alternating polarity are applied to the welding system so that over one half cycle, the welding voltage is relatively low and the welding current is relatively high. The welding current half-cycle pulses during this period can be considered good-burning pulses. The alternate pulses (i.e. those of alternate-half cycles) may then be termed oxide-limiting or oxide-controlling pulses or half cycles. The resulting plasma arc is found to be especially stable. The good-burning half cycles generally have the workpiece poled positively to the electrode, i.e. the circuit applies a negative pulse to the electrode. When the positive half cycle is applied to the electrode, the low-burning half cycle is encountered. When, on the other hand, the system is operated in the reverse sense so that the applied potential is relatively high and the welding current relatively low, the welding operation becomes unstable.

We have found that it is desirable to maintain the stability of the plasma arc by providing at the beginning of each low-burning pulse, i.e. a pulse in which a high negative potential is applied to the electrode and high voltage but low current may be expected, an additional voltage peak for a brief period to ignite plasma arc and prevent its extinction. When the welding current is a train of rectangular pulses in the cadence of the supply frequency, e.g. 50 Hz, the half cycles may have durations of about 10 msec. The voltage peak may then be provided for a period of 1 to 2 msec. at the beginning of each low-burning pulse. With 60Hz supply frequency a similar duration of the voltage peak may be employed.

To produce the rectangular alternating-polarity pulse train and to maintain the switching time or polarity-reversal interval at a minimum, it has been found to be advantageous to energize the plasma generator with direct current from a d-c source with a falling voltage/-current characteristic whose time constant at most is equal to the polarity reversal time of the alternating current.

According to the apparatus aspects of the invention, the circuit for energizing the plasma generator and applying the rectangular reversing-polarity pulse train across the electrode and the workpiece comprises four controllable diode-like or rectifier elements in a bridge circuit, the electrode and workpiece being connected in series along one diagonal of the bridge while the other diagonal is directed across the direct-current source with declining characteristics defined above. The concept of a controllable rectifier or diode-like element has been introduced to describe semiconductor devices having rectifier characteristics in the sense that they are conductive in only one direction, but conduct only when properly biased or triggered. Many such devices have been provided in recent years and these include diodes having adjustable breakdown levels, transistors whose emitter-collector electrodes form a rectifying path, solid state controlled rectifiers and thyristors. In all cases, however, the unidirectional conductivity is required. The controllable diodes are preferably transistors or thyristors as described above.

The switchable rectifier devices of the bridge circuit are preferably triggered in pairs through a multivibrator circuit or flip-flop operated in the cadence of the supply frequency. To this end, we may provide full-wave rectifier means for generating a train of raw-rectified direct-current pulses each corresponding to a half cycle of the sinusoidal alternating current and a switch means, e.g. a bilateral switch of adjustable breakdown potential, for producing a trigger pulse for the multivibrator circuitry when the potential rises to a predetermined level during each of these direct-current pulses. Preferably, the flip-flops are each provided with a transformer connected in circuit to the bilateral switch and have outputs, depending upon the state desired in the respective transistor, which are applied through respective amplifiers to the transistors. Each multivibrator may have a second input for preventing false pulses from being generated as a result of signal noise or perturbations. The additional inputs to the multivibrators may derive from another bilateral switch and a raw-rectified d-c source.

DESCRIPTION OF THE DRAWING

The above and other objects, features and advantages of the present invetion will become more readily apparent from the following description, reference being made to the accompanying drawing in which.

SPECIFIC DESCRIPTION

Figure 1:
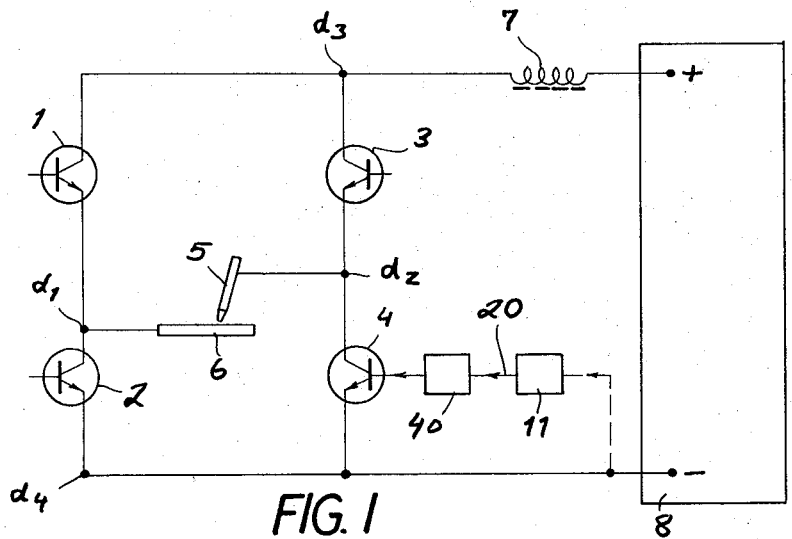
FIG. 1 is a circuit diagram of a system for energizing a plasma-welding arrangement according to the invention, somewhat simplified and in block-diagram form.

In FIG. 1 of the drawing, we have shown four transistors 1, 2, 3, 4 representing controllable rectifier elements or diodes, whose collector-emitter networks are connected in a bridge having diagonals with terminals $d_1$ and $d_2$ and diagonals $d_3$–$d_4$, respectively. One diagonal of the bridge is spanned by the electrode 5 and the workpiece 6, forming the main welding-current network, while the other diagonal is connected across a direct-current source 8 and a choke 7 with a sintered-iron core. The choke 7 is connected between the positive terminal of the source 8 and the collectors of transistors 1, 3.

The base of transistor 4, which has its collector tied to the electrode 5 and its emitter connected to the diagonal $d_3$, $d_4$ and tied to the negative pole of the d-c source, is energized via the output of an amplifier 40 which, in turn, is energized by the output 20 of a flip-flop 11. In a similar manner, the base of transistor 1, whose collector is connected with the choke 7 and whose emitter is connected with the workpiece, can be biased into conductivity by a further amplifier connected to the output 20 of a flip-flop 11 (see FIG. 5).

Figure 5:
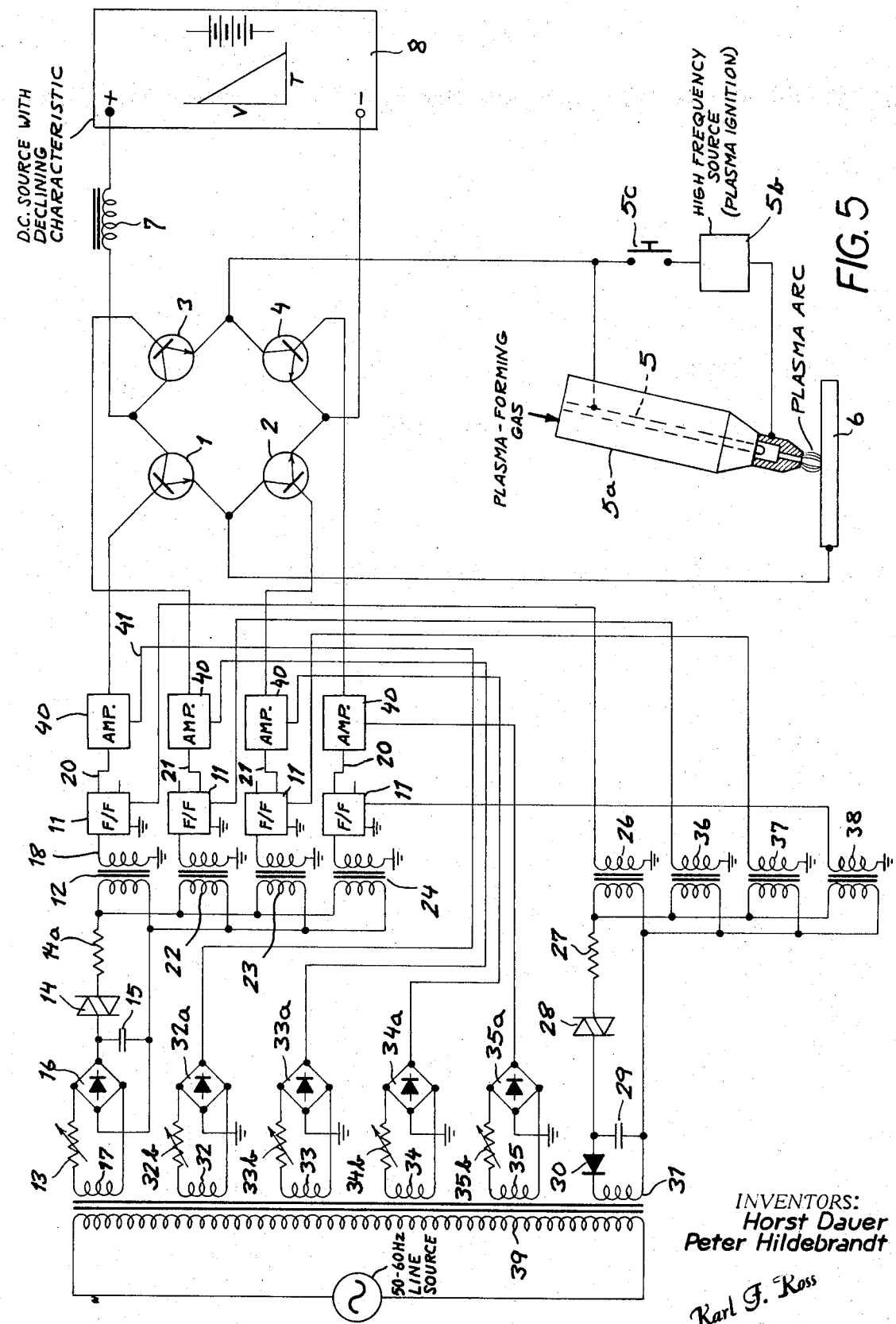
FIG. 5 is a circuit diagram representing the overall system and partly in block form with other parts shown in idealized construction.

The transistor 2, which has its collector tied to the workpiece 6 and its emitter connected to the negative terminal of the d-c source 8 and the transmitter 3, which has its collector connected to the choke 7 and its emitter connected with the electrode 5, are provided with respective base circuits including amplifiers 40, these amplifiers 40, however, are energized by the outputs 21 of the respective flip-flop 11. The circuit of the present invention thus provides each of the four transistors 1 – 4 with a respective amplifier 40 and a respective flip-flop 11, the opposite transistors being conductive simultaneously to pass respective signal pulses through the working diagoanl of the bridge. In all, four amplifiers 40 and four flip-flop 11 are employed as best seen in FIG. 5. The flip-flop may be constructed as described at pages 362 ff. of PULSE, DIGITAL, AND SWITCHING WAVEFORMS, Millman and Taub, McGraw-Hill Book Company, New York, 1965. The transistors of the bridge are of the silicon NPN type.

Figure 2:
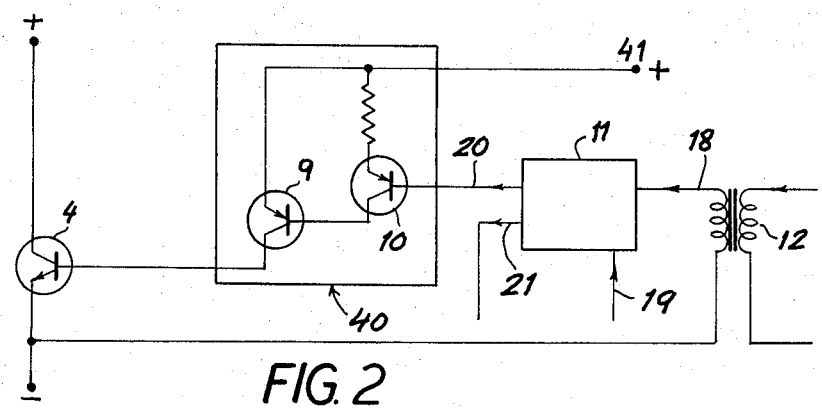
FIG. 2 is a circuit diagram representing a detail of FIG. 1.

In FIG. 2, we have shown in somewhat more detail the contruction of the amplifier circuit represented at 40 in FIGS. 1 and 5. While the amplifier is shown here to be connected to the base of transistor 4, it should be understood that similar constructions are used for the other amplifiers which are connected to the respective transistors. The amplifier 40 comprises two PNP transistors 9 and 10 whose output is found at the collector of transistor 9 while the input is at the base of transistor 10. The collector of this transistor is, as is generally the case with cascade amplifier transistors, applied to the base of the output transistor 9. The input of amplifier 40 is connected with the output 20 of bistable multivibrator 11 which has, as is customary, another output 21 of complementary state. For the transistors 2 and 3, the output 21 of the respective bistable multivibrators 11 are applied to the amplifier inputs 40 (see FIG. 5). Furthermore, each of the amplifiers 40 has a emitter follower input which is represented as a direct-current voltage applied at 41. From FIG. 5, it can be seen that the emitter follower potentials may derive from transformer secondaries 32 – 35 through rectifier bridges 32a – 35a, energized via adjustable resistors 32b – 35b. Each of the bistable multivibrators or flip-flops 11 has an input 18 from the secondary of a transformer 12, as shown in somewhat more detail in FIGS. 3 and 5, and a further input 19 derived from respective transformers 26, 36, 37 and 38.

Figure 3:
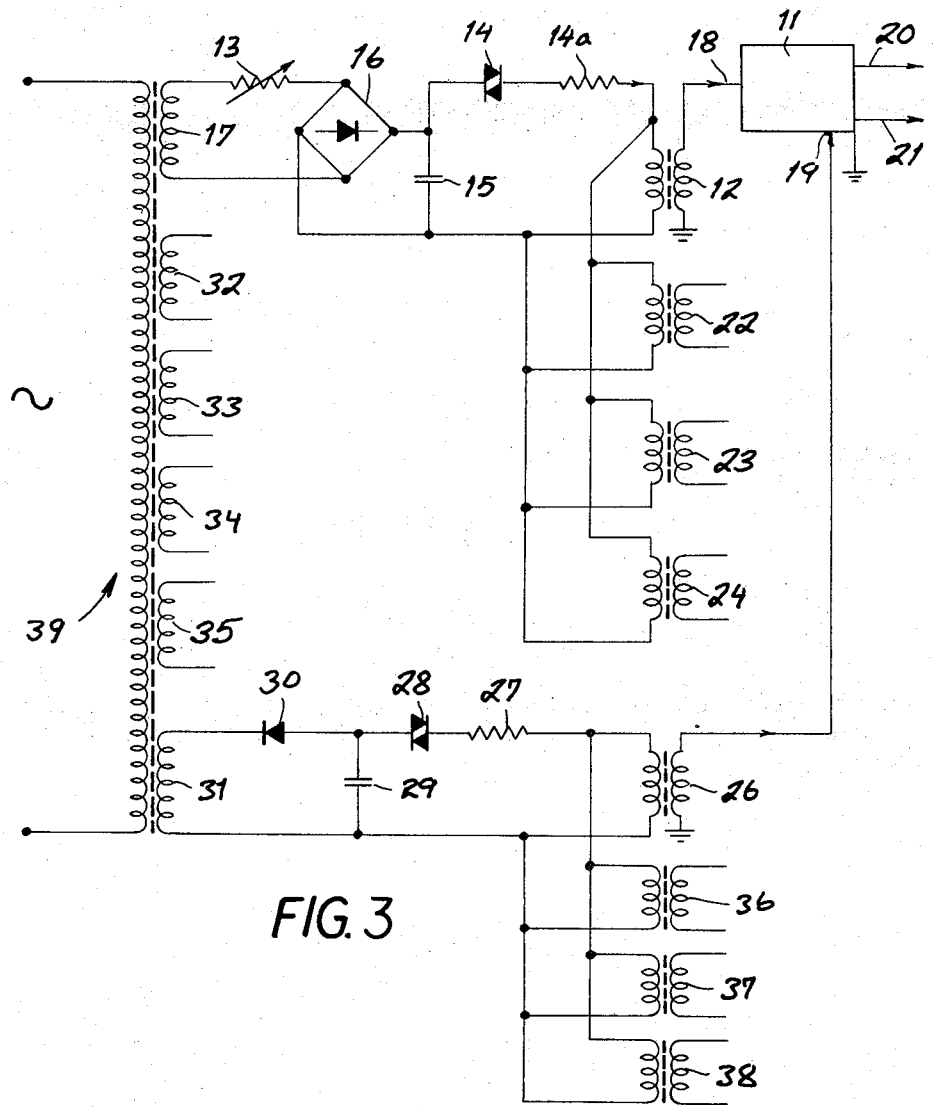
FIG. 3 is a circuit diagram showing other aspects of the invention.

From FIGS. 3 and 5, it can be seen that one input 18 of each flip-flop 11 derives from the secondary of a transformer 12 (22, 23, 24) whose primary is energized by a resistor 14a through a bilateral switch 14. The bilateral switch 14 may, of course, be a diac which is triggered at a predetermined threshold or regulated by the reverse bias applied thereto. The input of the bilateral switch 14 derives from a full-wave rectifier bridge 16 forming a d-c source and bridged by a smoothing capacitor 15. The bridge 16 is energized by the secondary 17 of an isolating transformer 39 at the supply frequency through a variable resistor 13.

The second input 19 to each of the bistable multivibrators 11 derives from the secondary of a transformer 26 (36, 37, 38 for the other bistable multivibrators), whose primaries lie in series with a current-limiting resistor 27 and another bilateral switch 28 whose input receives pulsating direct current (raw-rectified or half-wave pulses) from a rectifier diode 30 and a transformer secondary 31 at the cadence of the supply frequency. Capacitor 29 provides some smoothing of the d-c voltage between the diode 30 and the bilateral switch 28.

The transformer 39 is also provided with secondary windings 32 – 35 which, via the resistors 32b – 35b, the rectifiers 32a – 35a, and conductors 41, supply the d-c potential to the four emitter-follower amplifiers 40.

The welding system is shown in somewhat more detail in FIG. 5, from which it can be seen that the electrode 5 is surrounded by a gas tube 5a forming a plasma generator with the electrode and receiving a plasma-forming gas in the usual manner. A high-frequency source 5b may be momentarily connected by a switch 5c across the electrode 5 and the housing 5a to initiate the discharge forming the plasma, the arc being thereafter generated between the electrode 5 and the workpiece 6.

Figure 4:
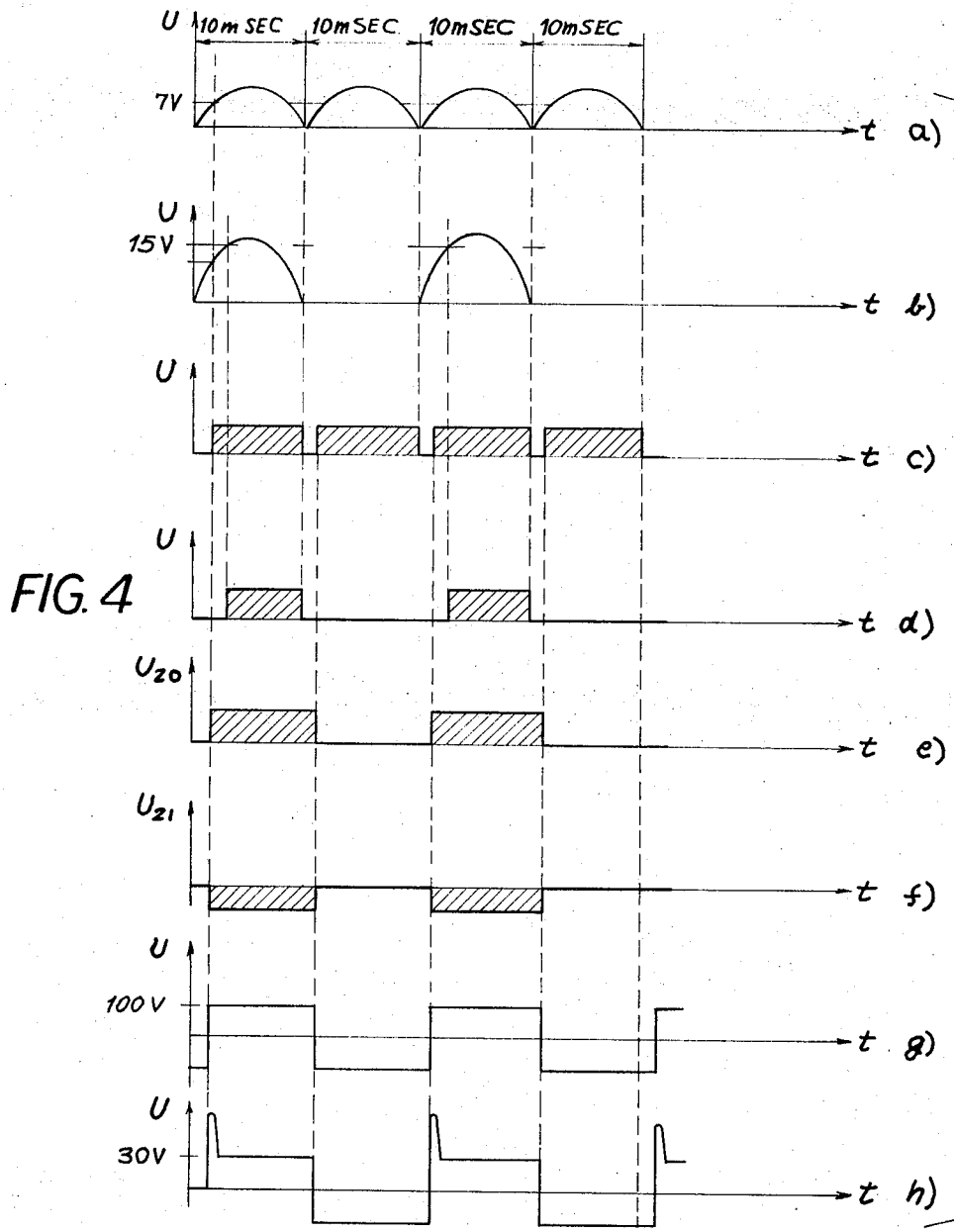
FIG. 4 is a graph illustrating various wave forms appearing in the circuit of the present invention.

When the transistor pair 1, 4 is triggered into a conductive state by the corrresponding signal from the respective flip-flop and the transistor pair 2, 3 are in blocking condition, the negative pole of source 8 is connected to the workpiece 6 while the positive pole of the d-c source is applied to the electrode 5. Between the welding electrode 5 and the workpiece 6 there can be measured an open circuit voltage of, for example, 100 V. When the transformer 39 is operated with alternating currents of a frequency of 50 Hz, the multivibrators are switched at this cadence so that transistor pair 2, 3 are rendered conductive and transistor pair 1, 4 are blocked after an interval of 10 msec. In this case, the workpiece 6 is poled positively with respect to the electrode 5 for a period of another 10 msec., whereby the polarity is reversed. This open circuit-pulse train is represented in graph $g$ of FIG. 4.

Upon ignition of the plasma arc, for example, by the application of high frequency in the manner described, the open-circuit voltage is reduced to the working voltage of about 30 V with a corresponding increase in the amplitude of the welding current. The level of the welding current during each pulse is determined by the characteristics of the d-c source 8.

The control of the four flip-flops, described for the flip-flop 11 of FIG. 3, is effected as follows: The bilateral switch 14 is subjected to a pulsing raw-rectified direct current (waveform $a$ of FIG. 4) having a maximum amplitude of, say, 24 V. Each of these pulses has a duration of a half-cycle and thus about 10 msec. At a preset threshold of, say, 7 V, the bilateral switch 14 is triggered into the conductive state and remains therein until the applied voltage (waveform $a$) returns to 0. At each 10 msec., therefore, a new pulse is applied to the transformer 12 and is in the form of the square-wave signal of waveform $c$ of FIG. 4 applied to the flip-flop 11. As a result, the output 20 of the flip-flop 11 generates a pulse train, as shown for waveform *e* of FIG. 4. This pulse train represents the rectangular positive pulse train of a duration of slightly less than 10 msec. and at a cadence with a period of 10 msec. which is applied to the arc gap. At the complementary output 21 of the multivibrator, a negative pulse train *f* of FIG. 4 of identical periodicity and pulse length is generated. By adjustment of the resistor 13, the threshold amplitude of switch 14 can be changed to increase the voltage rise by half-cycle or reduce it and enable the threshold voltage to be reached sooner or later. The duration of the pulses produced by the flip-flop can thus be adjusted.

To prevent spurious signals from being generated at the flip-flop, each of the flip-flops is provided with a further input at 19 designed to set the outputs 20 and 21 as previously described at the designed levels. Thus, one transistor pair 1, 4, can be cut out while the other transistor pair 2, 3 can be rendered conductive. The additional impulse is produced by the bilateral switch 24 and follows the half-wave rectified waveform *b* in FIG. 4 at 20 msec. intervals as described for the full-wave waveform *a*. The waveform *b* is so selected as to produce the pulses (waveform *d*) slightly behind each of the pulses of waveform *c*. The waveform *h* of FIG. 4 thus represents the signal which is applied to the electrode and it can be seen that each positive pulse includes an igniting voltage rise (overall) of, say, 150 volts, including the open-circuit voltage of 100 V superimposed upon the machining voltage which falls to 30 V during the process. Waveform *g* represents the substantially constant welding voltage during open-circuit operation.

We claim:

1. A plasma-welding system, comprising: four controllable semiconductor devices connected in a bridge support with each of the devices constituting a branch of the bridge;
   a direct-current source connected in a first diagonal of the bridge and constituting the sole welding-current source;
   a plasma-welding torch having an electrode spacedly juxtaposed with a workpiece, said electrode and said workpiece being connected across said bridge as the second diagonal thereof; and
   a trigger network connected to said semiconductor device for selectively rendering same conductive to apply a rectangular wave form alternating current across said electrode and said workpiece.

2. The plasma-welding system defined in claim 1 wherein each of said devices is a three terminal solid-state element having a pair of principal electrodes constituting the respective branch of said bridge, and control terminals connected to said trigger network, said trigger network including flip-flops for energizing pairs of control terminals in alternate states and amplifier means between said flip-flops and the respective control terminals.

3. The plasma-welding system defined in claim 2 wherein each flip-flop includes at least one bistable monovibrator having an input, means for producing a direct-current pulse train of a predetermined cadence of a bilateral switch interposed between the last mentioned means and said bistable monovibrator and conductive upon a voltage rise during each pulse of said train for activating the bistable monovibrator.

4. The plasma-welding system defined in claim 3 further comprising another bilateral switch movement connected to another input of said bistable monovibrator and triggerable in response to a supply frequency.

5. The plasma-welding system defined in claim 4, further comprising a transformer having a secondary winding connected to each of said inputs and a primary winding energized by the respective bilateral switch.

6. The plasma-welding system defined in claim 5 further comprising a rectifier diode connected in series with said other bistabile switch to a source of alternating current, and a capacitor connected between said diode and said other bistable switch.

7. The plasma-welding system defined in claim 1 wherein each of said devices is a transistor having its collector-emitter network forming the respective branch of said bridge, and a base connected to said trigger network.

8. The plasma-welding system defined in claim 7 further comprising a sintered-iron-core choke connected between said source and said bridge in said first diagonal.

* * * * *